Oct. 27, 1953 — E. S. MARION — 2,657,027
MOTOR VEHICLE AIR CONDITIONER
Filed Aug. 24, 1951 — 2 Sheets-Sheet 2

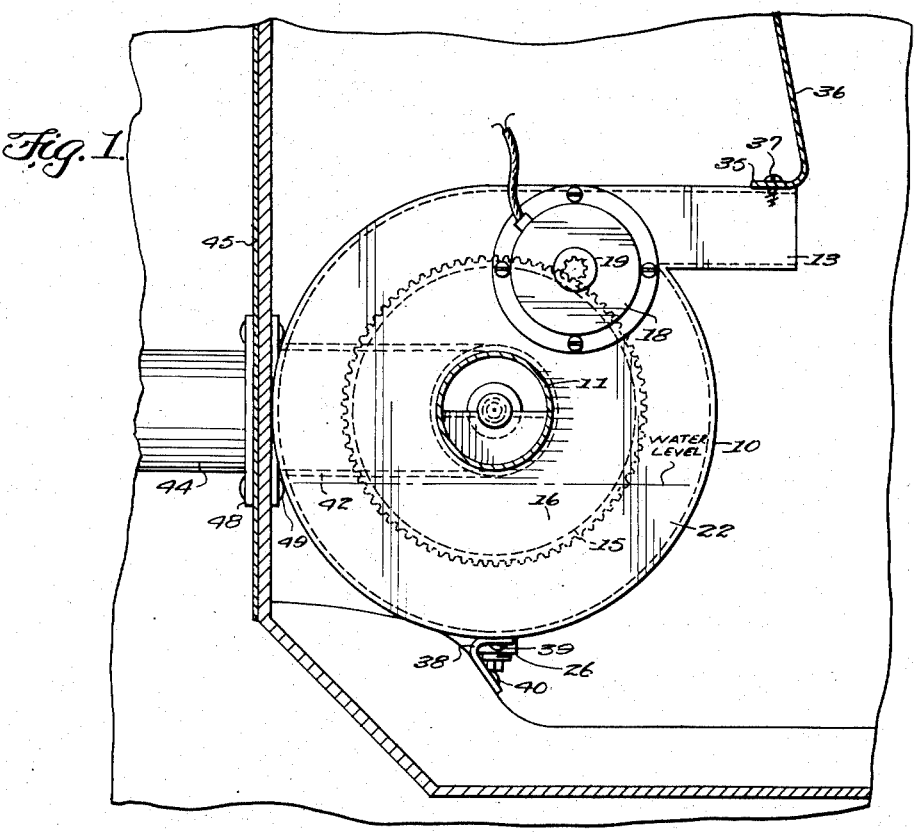

INVENTOR.
Ernest S. Marion,
BY Victor J. Evans & Co.
ATTORNEYS

Patented Oct. 27, 1953

2,657,027

UNITED STATES PATENT OFFICE 2,657,027

MOTOR VEHICLE AIR CONDITIONER

Ernest Shelby Marion, Walsh, Colo.

Application August 24, 1951, Serial No. 243,528

2 Claims. (Cl. 261—92)

This invention relates to air-conditioning devices of the type used in motor vehicles, and in particular an air-conditioning device wherein air entering the body of a vehicle passes through a rotating cylinder of fibrous material and wherein the lower side of the cylinder passes through a body of water in the lower part of a surrounding housing.

The purpose of this invention is to provide an air-conditioner for a motor vehicle wherein air passing into the body of the vehicle is cleaned and cooled and in which the moisture content of the air is increased.

Various types of air-conditioners have been provided for motor vehicles, however, it is difficult to re-condition the air without elaborate machinery and equipment which occupies valuable space and which causes a drain on the battery. With this thought in mind this invention contemplates a cylindrical housing positioned below the instrument board or panel of a motor vehicle with water in the lower part of the housing and with air passing into the ends of the housing and passing through a rotating fibrous cylinder, and the lower side of which dips into the water in the housing, clean, cool, and moist air is discharged into the body of the vehicle.

The object of this invention is, therefore, to provide means for forming an air-conditioning device for motor vehicles whereby air passing into the body of the vehicle passes through a rotating fibrous cylinder saturated with water.

Another object of the invention is to provide an air-conditioner for motor vehicles that may readily be installed below the instrument panel of a vehicle and in which the only moving part is a fibrous cylinder journaled in the housing of the device.

A further object of the invention is to provide an air-conditioner for motor vehicles which is of a simple and economical construction.

With these and other objects and advantages in view the invention embodies an elongated cylindrical housing having air inlet connections extended from the ends, with a continuous outlet opening extended from the upper part and with a rotating fibrous cylinder journaled in the housing and positioned to dip into water carried by the lower part of the housing.

Other features and advantages of the invention will appear from the following description taken in connection with the drawings wherein:

Figure 1 is an end elevational view of the air-conditioning device illustrating the housing thereof mounted in a motor vehicle between the lower edge of the instrument board and floor.

Figure 2 is a plan view of the air-conditioning unit showing the unit installed on the front wall or cowl of a motor vehicle.

Figure 3:
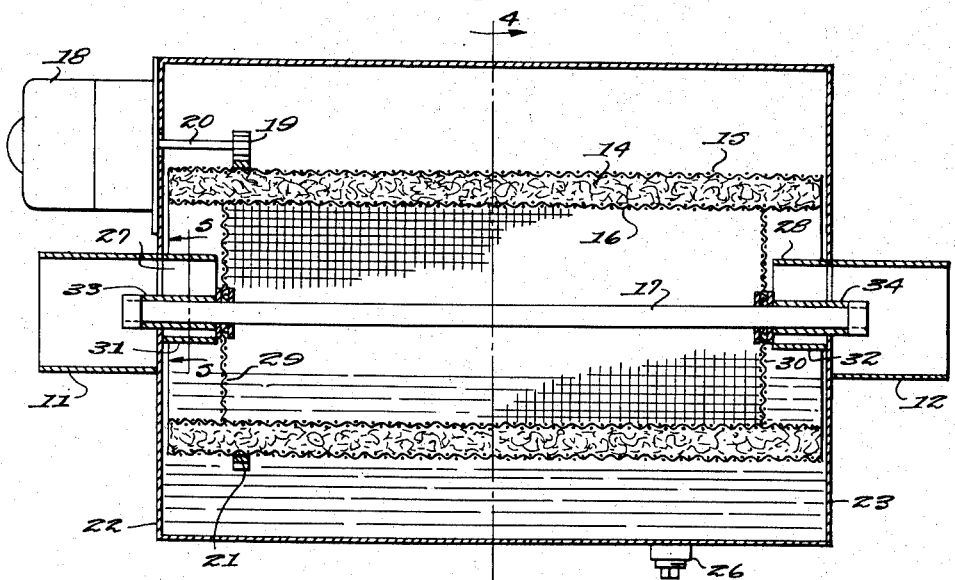
Figure 3 is a longitudinal section through the unit.

Referring now to the drawings wherein like reference characters denote corresponding parts the improved air-conditioner of this invention includes a cylindrical housing 10 having inlet connections 11 and 12 at the ends and an outlet connection 13 extended from the upper side, a fibrous cylinder having fibrous material 14 positioned between cylindrical screens 15 and 16 and journaled in the housing by a shaft 17, and a motor 18 mounted on the housing and positioned to rotate the fibrous cylinder through a pinion 19 on a motor shaft 20 and a gear 21 carried by the cylinder and positioned to mesh with the pinion 19.

Figure 4:
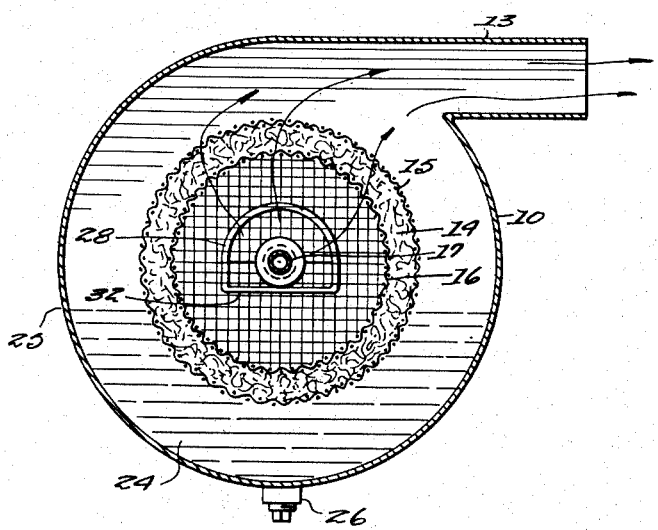
Figure 4 is a cross section through the housing of the air-conditioner taken on line 4—4 of Figure 3.

The housing 10 is formed with a cylindrical wall having end plates 22 and 23 providing closures for the ends and with the housing positioned as shown in Figures 3 and 4 a body of water 24 is provided in the lower part of the housing whereby the lower side of the fibrous cylinder travels through the water. It is desired to maintain the water level at the point 25, however, it will be understood that the water level will fluctuate as water is used from the housing. The lower part of the housing 10 is provided with a drain plug 26, thereby providing means for cleaning the housing.

The air connections 11 and 12 are provided with extended sections 27 and 28, respectively, which carry the air through the ends of the housing and whereby the air is discharged directly through wire mesh or screen discs 29 and 30 which extend across, and which are spaced from, the ends of the cylinder formed with the fibrous material 14 and the cylindrical screens 15 and 16. By this means the air passes directly into the interior of the cylinder and with the ends of the cylinder substantially engaging the end plates 22 and 23 of the housing the air is forced to pass outwardly through the fibrous material between the screens 15 and 16.

Figure 5:
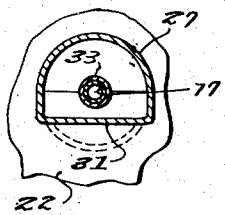
Figure 5 is a detail showing a section taken on line 5—5 of Figure 3 illustrating one of the bearings with which the fibrous cylinder is journaled in the housing.

The extending sections 27 and 28 of the air connections are provided with flat sides 31 and 32 on which bearing sleeves 33 and 34, respectively, are mounted, as illustrated in Figures 3 and 5, and with the ends of the shaft 17 extended into the sleeves 33 and 34 the fibrous cylinder, which is carried by the shaft is free to rotate.

A typical installation is illustrated in Figure 1 wherein the upper part of the housing is secured to a flange 35 on the lower edge of the instrument panel 36 by a screw 37 and the lower side of the housing is held by a clip 38 with screws 39 and 40 therein, to the floor of the vehicle.

The air connections 11 and 12 extend into tubular bends 41 and 42 and the bends are positioned on the ends of tubular conduits 43 and 44 respectively that extend through the front wall 45 and to the forward part of the engine hood. These tubes are conventional being standard equipment in motor vehicles. The tube 43 is secured in the wall 45 by flanges 46 and 47 and the tube 44 is held in position by flanges 48 and 49.

With the air-conditioner installed in a motor vehicle as shown and described air entering the housing 10 through the tubes 43 and 44 and connections 11 and 12 passes directly into the interior of the rotating fibrous cylinder and in passing through the fibrous walls of the cylinder the air is cleaned and supplied with moisture. The moist cool air is discharged through the connection 13 into the body of the vehicle.

It will be understood that modifications may be made in the design and arrangement of the parts without departing from the spirit of the invention.

What is claimed is:

1. In a motor vehicle air-conditioner, the combination which comprises a cylindrical housing adapted to be positioned below the instrument panel of a motor vehicle, said housing having an area for retaining water in the lower part, tubular air inlet connections having a dome shaped portion of a reduced area extended through the ends of the housing, a shaft extended through the housing and journaled in bearings mounted in the dome shaped portion of said air inlet connections, a cylinder formed with fibrous material retained between cylindrical screen mounted by wire mesh end sections on said shaft, said end sections spaced inwardly from the ends of the wire mesh cylinders at the inner ends of the dome shaped portions of said air inlet connections, and means rotating the said fibrous cylinder, said housing having an outlet opening therein.

2. A motor vehicle air-conditioner as described in claim 1 wherein the means rotating the fibrous cylinder includes a motor having a shaft with a pinion on the motor shaft meshing with a gear positioned on the fibrous cylinder.

ERNEST SHELBY MARION.

References Cited in the file of this patent

UNITED STATES PATENTS

| Number | Name | Date |
| --- | --- | --- |
| 901,237 | Graumuller | Oct. 13, 1908 |
| 1,447,884 | Philippi | Mar. 6, 1923 |
| 2,144,426 | Klein | Jan. 17, 1939 |
| 2,169,942 | Crandall et al. | Aug. 15, 1939 |
| 2,300,580 | Loprich | Nov. 3, 1942 |
| 2,587,197 | Mousel | Feb. 26, 1952 |